United States Patent [19]

Nehmey et al.

[11] 4,360,602

[45] Nov. 23, 1982

[54] FOAMED CHLORINATED POLYVINYL CHLORIDE AND COMPOSITIONS FOR MAKING SAME

[75] Inventors: Samuel D. Nehmey, Lorain; James W. Summers, Bay Village, both of Ohio

[73] Assignee: The B. F. Goodrich Company, Akron, Ohio

[21] Appl. No.: 301,906

[22] Filed: Sep. 14, 1981

[51] Int. Cl.$^3$ ................................................ C08J 9/10
[52] U.S. Cl. ................................ 521/95; 264/53; 264/211; 264/DIG. 5; 264/DIG. 13; 521/79; 521/139; 521/145; 521/909; 521/910; 521/81
[58] Field of Search ............... 521/95, 145, 79, 81, 521/139; 264/53, 211, DIG. 5, DIG. 13

[56] References Cited

U.S. PATENT DOCUMENTS

| 3,267,051 | 8/1966 | Landler et al. | 521/145 |
| 3,366,580 | 1/1968 | Kraemer, Jr. | 521/91 |
| 3,975,315 | 8/1976 | Parks | 521/145 |
| 4,046,846 | 9/1977 | Fujimori | 521/60 |
| 4,048,272 | 9/1977 | Spicuzza, Jr. | 521/60 |
| 4,165,415 | 8/1979 | Adachi et al. | 521/145 |

FOREIGN PATENT DOCUMENTS 710379  5/1965  Canada .

*Primary Examiner*—Morton Foelak
*Attorney, Agent, or Firm*—George A. Kap

[57] ABSTRACT

Composition of matter that can be foamed to form an expanded product having density of less than 20 lbs/ft$^3$ and containing a preponderance of the cells in the size range of less than 500 microns comprising a mixture of chlorinated polyvinyl chloride, 5 to 50 parts by weight of the chlorofluoroalkane of 1 to 2 carbon atoms as a primary blowing agent and 0.01 to 2 parts by weight of azodicarbonamide that is dispersed through the resin and forms cell nuclei from which expanded cells are created, all based on 100 parts by weight of the resin.

10 Claims, No Drawings

FOAMED CHLORINATED POLYVINYL CHLORIDE AND COMPOSITIONS FOR MAKING SAME

BACKGROUND OF THE INVENTION

Low density foam is generally defined as having a density of about 20 lbs./ft$^3$ and below. Polyvinyl chloride alone cannot be used to make low density foam since it contains 5 to 10% crystallinity that does not melt completely until 215° C. Because of its poor thermal stability, polyvinyl chloride cannot be processed at 215° C. for long periods of time. Even at lower temperatures, where polyvinyl chloride can be more suitably extruded, it makes poor foam because the crystallites act as physical crosslinks to restrict growth of the cells during expansion, thus yielding high density foam. With increasing blowing pressure in the cells, which may be due to a larger volume of a blowing agent, the polyvinyl chloride structure is ruptured resulting in collapse of the foam, which makes it impossible to make low density foam.

Attempts have been made to overcome the problems created by the presence of crystallites in polyvinyl chloride. U.S. Pat. No. 2,901,446 to Hawkins discloses low density polyvinyl chloride foam that is prepared from a composition comprising polyvinyl chloride admixed with a blowing agent and a solvent boiling above 80° C. The purpose of the solvent is to solubilize the crystallites in polyvinyl chloride and render it more nearly amorphous so that low density foam can be made therefrom. It should be noted that the Hawkins patent discloses the use of azodicarbonamide as the blowing agent, among many others listed in column 2. The blowing agents disclosed by Hawkins are primary blowing agents, as distinguished from nucleating agents, that provide all of the gas required for expanding polyvinyl chloride.

The Landler et al U.S. Pat. No. 3,267,051 discloses a foaming composition comprising polyvinyl chloride, a polyisocyanate, a swelling or blowing agent, at least one vinyl monomer, an ethylenic anhydride, and a saturated halogenated hydrocarbon. Azodicarbonamide is disclosed at top of column 3 as a suitable swelling or blowing agent, along with a number of chlorofluoroalkanes, such as trichlorofluoromethane, as examples of suitable saturated halogenated hydrocarbons. Although the Landler et al patent discloses a combination of azodicarbonamide and trichlorofluoromethane in a polyvinyl chloride composition, this composition also includes a polyisocyanate, at least one vinyl monomer, and an ethylenic anhydride. As is described below, the chlorinated polyvinyl chloride compositions disclosed herein, although they do contain a chlorofluoroalkane as a primary blowing agent and azodicarbonamide as a nucleating agent, do not require the presence of either a polyisocyanate, a vinyl monomer, or an ethylenic anhydride to make low density foam.

The Kraemer et al U.S. Pat. No. 3,366,580 discloses foaming of chlorinated polyvinyl chloride using a chlorofluoroalkane as a primary blowing agent and numerous nucleating agents disclosed at about the middle of column 5. It should be noted that azodicarbonamide is not disclosed as a suitable nucleating agent although sodium bicarbonate and citric acids are, which, as will be shown, are ineffective to produce the desired cell structure.

SUMMARY OF THE INVENTION

This invention relates to low density chlorinated polyvinyl chloride foam containing closed cells of 500 microns or less and to a composition comprising chlorinated polyvinyl chloride resin, a primary blowing agent selected from halogenated hydrocarbons of 1 to 3 carbon atoms, and azodicarbonamide as a nucleating agent in amount of less than 5 weight percent based on 100 parts of the resin.

DETAILED DESCRIPTION OF THE INVENTION

The chlorinated polyvinyl chloride foam of this invention is prepared from a composition comprising chlorinated polyvinyl chloride resin, a primary blowing agent selected from halogenated hydrocarbons of 1 to 3 carbon atoms, azodicarbonamide a nucleating agent, stabilizer, a processing aid, a lubricant, and possibly other conventional ingredients. The foam is characterized by closed-cell structure, cell size of 500 microns or less, density of less than 20 lbs/ft$^3$ and low thermal conductivity to enable the foam to be used in insulating applications such as rigid wall insulation, roofing, and pipe insulation.

The chlorinated polyvinyl chloride resin employed in the present invention can be readily prepared by the post-chlorination of commercially available polyvinyl chloride resin. Prior to post-chlorination, the polyvinyl chloride generally has a chlorine content of about 56.7% by weight, a glass transition temperature of from about 75° to 80° C., and a density of about 1.40 grams per cubic centimeter. Polyvinyl chloride can be post-chlorinated by a number of procedures including chlorination in a solution; chlorination in an aqueous suspension, or a suspension in a swelling agent; and direct chlorination of dry, polyvinyl chloride powder. It has been found particularly convenient to chlorinate the polyvinyl chloride in an aqueous suspension. A typical procedure for carrying out such chlorination comprises agitating an aqueous suspension of 15 parts by weight of polyvinyl chloride and 100 parts by weight of water in a pressure vessel which has been purged with nitrogen, heating the suspension to 140° C., and introducing chlorine at a rate of about 2 parts by weight per hour until the polyvinyl chloride is chlorinated to the desired extent.

In order to foam the chlorinated polyvinyl chloride in accordance with the present invention, it must have a minimum chlorine content of at least 60% by weight, while for practical purposes, the maximum chlorine content feasible is about 75% by weight. The preferred chlorine content is about 64–73% by weight. As the chlorine content of the polymer is increased from 60% to 64% by weight, two advantages are obtained. First, the ability to tolerate high temperatures is increased from 80° C. to about 100° C., thus enabling the polymer to better withstand contact with hot objects such as steam pipes and molten tar. Second, it is easier to retain the chlorofluoroalkane blowing agents within the chlorinated polyvinyl chloride. Thus, at 64% chlorine content by weight, it has been found possible to produce light weight, uniform cellular products which have densities of less than 3 pounds per cubic foot, contain chlorofluoroalkane blowing agents within their cells, and are dimensionally stable at temperatures up to about 100° C.

The glass transition temperature of chlorinated polyvinyl chloride increases with increasing chlorine content. Polyvinyl chloride itself has a glass transition temperature of about 75°–80° C., while typical glass transition temperatures for chlorinated polyvinyl chloride suitable for the present invention are about 87° C. for 60% chlorine content, about 106° C. for 64% chlorine content, about 128° C. for 68% chlorine content, and about 178° C. for 75% chlorine content. The maximum obtainable temperature of dimensional stability is generally a few degrees below the glass transition temperature of the polymer.

In place of polyvinyl chloride homopolymer, there can be used, as a starting material, either a mixture of polyvinyl chloride polymer with a minor amount of other polymers, or a copolymer of vinyl chloride with a minor amount of another monomer(s) that are selected from other vinyl halides and vinylidene halides such as vinylidene chloride; vinyl esters such as vinyl acetate, vinyl butyrate and vinyl benzoate; acrylic, α-alkyl acrylic acids, their alkyl esters, amides and nitriles such as acrylic acid, methacrylic acid, ethyl acrylate, octyl acrylate, methyl methacrylate, acrylamide, and acrylonitrile; vinyl aromatic compounds such as styrenes that include styrene, chlorostyrene, and ethyl styrene; vinyl naphthalene; alkyl esters of maleic and fumaric acids such as diethyl maleate; vinyl alkyl ethers and vinyl alkyl ketones; vinyl pyridine, isobutylene and various other polymerizable monoolefinic monomers, especially those containing the $CH_2=C<$ group. It is intended that the term "polyvinyl chloride," as used in the specifications and claims, include the obvious variations described above.

The particle size of the chlorinated polyvinyl chloride powder is generally within the range of about 10 to 600 microns. Excellent results have also been obtained with larger particles produced by pelletizing the chlorinated polyvinyl chloride powder. Suitable means of producing such pellets are the use of pellet mills and tablet presses. Typical pellets which can be employed are cylinders 3/16 inch in diameter by 5/16 inch long, as well as cubes of about ⅛ inch in size. However, the pellets and cubes can be larger or smaller and can be any desired shape.

Suitable primary blowing agents are the halogenated hydrocarbons containing 1 to 3 carbon atoms such as methyl chloride, methylene dichloride, ethyl chloride, ethylene dichloride, n-propyl chloride, and methyl bromide. A preferred group of halogenated hydrocarbon primary blowing agents are the chlorofluoroalkanes of 1 to 2 carbon atoms such as trichloromonofluoromethane, dichlorodifluoromethane, dichloromonofluoromethane, monochlorodifluoromethane, trichlorotrifluoroethane, dichlorotetrafluoroethane, and monochlorotrifluoroethane. Although the primary blowing agent can be used in an amount of about 5 to 50 parts by weight, it is preferred to have a quantity of blowing agent of about 10 to 40 parts by weight per 100 parts by weight of the chlorinated polyvinyl chloride absorbed in the polymer at the commencement of the foaming procedure. If the chlorinated polyvinyl chloride is stored in unexpanded form for any length of time after impregnation with the blowing agent, an excess of blowing agent should be initially absorbed to allow for losses.

A particularly outstanding product can be obtained when chlorinated polyvinyl chloride is expanded with one of the above-mentioned chlorofluoroalkanes. A substantial portion of the chlorofluoroalkane remains entrapped in the closed cells of the resulting foam. Since the thermal conductivities of the chlorofluoroalkanes are lower than that of air, the insulating propertities of the resulting foam are superior to those of foams having air-filled cells. For example, there are not at present any known blowing agent of low thermal conductivity which can be retained within the cells of polystyrene. As a result, the cells of polystyrene become filled with air within a short time after preparation and the thermal conductivity of the polystyrene foam is about 0.25 $Btu/(hr)(ft^2)(°F./in)$ at room temperature. The corresponding thermal conductivity of chlorinated polyvinyl chloride foam containing a chlorofluoroalkane blowing agent is less than 0.20, and even after prolonged storage, it usually reaches equilibrium at about 0.13.

The secondary blowing agent, also referred to herein as a nucleating agent, is azodicarbonamide that decomposes at 180° C. It is used in amount of less than 5 parts, preferably 0.01 to 2 parts, more preferably 0.1 to 1 part by weight per 100 parts by weight of the resin. There appears to be no need to add more than about 1 part of azodicarbonamide per 100 parts of the resin. When admixed in a powder form with a resin, it forms nucleating sites throughout the resin matrix that are filled with nitrogen gas. As the primary blowing agent is introduced into the resin matrix and allowed to expand therein, as by introducing the resin matrix into a zone of lower pressure, the gas generated by the primary blowing agent forces itself into the nucleating sites and expands the sites, thus forming numerous cells throughout the resin matrix. In the case where the primary blowing agent is a chlorofluoroalkane of 1 to 2 carbon atoms, foamed resin containing cells filled with a chlorofluoroalkane gas will have very low thermal conductivity that will make the use of such foamed products especially suitable in insulating applications.

Contrary to the teachings of the prior art, other known nucleating agents have been tried in place of azodicarbonamide but they did not perform acceptably since they are not effective in controlling the cell structure. Examples of such other nucleating agents are citric acid, sodium bicarbonate, p-toluene sulfonyl semicarbazide, and p,p'-oxybis (benzene sulfonyl hydrazide).

It is preferred to include a stabilizer in the formulation in case of exposure of the foam to excess or prolonged heating as a result of apparatus malfunctioning or other reasons. Suitable stabilizers that can be incorporated into the chlorinated polyvinyl chloride compositions include butyl tin, 2,6-ditert-butyl-4-methylphenol, pentaerythritol, and epoxy stabilizers that can be added in amount of 0.1 to 10 parts, preferably 0.5 to 5 parts per 100 parts of the resin. Other additives that can be incorporated include processing aids such as chlorinated polyethylene, styrene-butadienestyrene block polymers, and styrene-acrylonitrile in amount of 1 to 30 parts, preferably 5 to 20 parts per 100 parts of the resin; lubricants such as calcium stearate and ester waxes in amount of 1 to 5 parts; cell stabilizers such as sodium lauryl sulfonate or sulfate; etc.

The foams of the present invention can be prepared by absorbing a liquefied blowing agent in a chlorinated polyvinyl chloride formulation and then expanding the blowing agent into a gas, thereby forming cells within the polymer. For best results, the chlorinated polyvinyl chloride is impregnated with a blowing agent at an elevated temperature under sufficient pressure to maintain the blowing agent in at least a partially liquefied state, and then, the chlorinated polyvinyl chloride is either directly foamed by releasing the pressure at a temperature above the boiling point of the blowing agent or the impregnated polymer is cooled below the boiling point of the blowing agent before the environmental pressure is released to thereby give a noncellular product which can be subsequently foamed by expanding the blowing agent.

To impregnate the resin to be foamed with a primary blowing agent, particles of chlorinated polyvinyl chloride resin and other ingredients, such as a processing aid, a nucleating agent, and a lubricant, are placed in a pressure vessel which is either rotatable so as to impart a tumbling motion to said particles or equipped with mixing means, and a liquefied primary blowing agent is introduced into the vessel. The vessel is then heated to a temperature in the range of 50° to 150° C., but not exceeding the melting point of the polymer, under sufficient pressure to maintain a substantial portion of the blowing agent in liquefied state. The particles are then mixed with the blowing agent until the desired amount of the blowing agent is absorbed. The agitation during the absorption step should be sufficient to prevent agglomeration of the particles. In preventing agglomeration, it is also important not to exceed the melting point of the polymer. After absorption of the blowing agent, the particles are cooled below the boiling point of the blowing agent at atmospheric pressure, the pressure in the vessel is reduced to atmospheric, and the impregnated particles are removed from the vessel in an unexpanded state.

The chlorinated polyvinyl chloride resin impregnated with blowing agent by the absorption process can be made into foam in a number of ways. The resin can be fed through an extruder in which the extrusion cylinder and/or stock screw are equipped with heating means, and as the resin is advanced through the extrusion cylinder, it is converted to a viscous melt having a temperature above the boiling point of the blowing agent absorbed therein. While the resin is confined within the extrusion cylinder, the blowing agent cannot expand, and heating the blowing agent above its boiling point generates high pressures within the extruder. When the hot composition is forced through the extruder head into a zone of lower pressure, the blowing agent expands the resin forming a continuous log of cellular chlorinated polyvinyl chloride. The size and shape of this log are, of course, a function of the extruder die.

Another method of preparing the cellular product from the above-described expandable chlorinated polyvinyl chloride resin is by molding. A convenient means of accomplishing this is to partially fill a mold having gas escape openings with a sufficient quantity of expandable resin to fill the mold after foaming. After placing the resin in the mold, it is heated to a temperature above the boiling point of the blowing agent absorbed therein and above the softening point of the resin to thereby expand the resin and form a cellular product having the shape of the mold. The mold is then cooled prior to removal of the molded product.

If desired, a foam product can be extruded directly from chlorinated polyvinyl chloride resin without the intermediate step of presorption. To directly extrude foam, a blowing agent is injected into melted chlorinated polyvinyl chloride resin as the melt is being advanced through the extruder into a zone of lower pressure whereupon, due to the resulting drop in pressure, the blowing agent expands forming a cellular product.

The rigid foams of the present invention have a predominantly closed cell structure in which at least 60%, preferably over 85% of the cells are closed. With a well balanced system, it is possible to produce foam wherein essentially 100% of the cells are closed. A preponderance of the cells in the foam are 500 microns or less, preferably less than 200 microns in size. It is desired to have a preponderance of the cells in the size category below 200 microns since it appears that foams made from chlorinated polyvinyl chloride that have a preponderance of cells greater than 200 microns have compressive strength that is too low and thermal conductivity that is too high for construction insulating applications. Furthermore, it appears that convection currents are induced in foams having a cell size of 500 microns and greater. This, of course, adversely affects thermal conductivity of the foam which is undesirable, especially for insulating application. The density of the foam herein can vary up to about 20 lbs/ft$^3$, preferably about 1 to 5 lbs/ft$^3$ and particularly less than 3 lbs/ft$^3$. For most applications, it is not practical to exceed a density of 10 lbs/ft$^3$ or even 5 lbs/ft$^3$ due to the cost of the resin. Thermal conductivity of chlorinated polyvinyl chloride foam is less than 0.20 Btu/(hr)(ft$^2$)(°F./in.) and usually reaches equilibrium at 0.13. The foam of this invention is non-flammable and thus, does not require incorporation of fireproofing agents. It can be used in heat and sound insulation applications, floats, packaging, and the like.

It should be understood that reference to preponderance of cells being of certain size is an inexact approximation and is used as a general guideline. The cell sizes were determined by taking photomicrographs along a section cut through a foam sample. In many photomicrographs where the cell size was on the order of 1000 microns, only one and portions of other cells showed whereas photomicrographs of foam samples having all sizes of 200 to 300 microns, showed many cells in full and apparently portions of many others. Although portions of the cells or small cells that were shown in the photomicrographs appeared to be much smaller than full sized cells, it should be evident that what was photographed may have been only a small portion of a normal cell. Therefore, based on examination of the photomicrographs, it appears safe to state that by preponderance it is meant that at least 50% and probably in excess of 75% of the cells fall into the indicated cell size.

The following examples are presented for illustrative purposes and it should be understood that they are not to be used to limit the invention herein in any way, the scope of which is defined by the claims appended hereto. The chlorinated polyvinyl chloride used herein was in cube form about ⅛ inch square that was soaked in the primary blowing agent at 80° C. and at 80 psi for 72 hours, together with other ingredients in the formulation. Unless otherwise indicated, 40 parts of trichlorofluoromethane was used per 100 parts of the resin. In making the foam, the soaked formulation was melted on a mill and then passed through a ¾ inch diameter single screw Brabender extruder with a 25/1 L/D operating at 30 rpm. The die was of a dog bone design of 0.0175 square inches in area and 0.396 inch long. The product emerged as a narrow strip about 1 inch wide of a variable thickness of about ¼ inch. The temperature profile of the extruder was as follows:

| | | |
|---|---|---|
| 1st zone | — | 105° C. |

| | | |
|---|---|---|
| 2nd zone | — | 165° C. |
| 3rd zone | — | 160° C. |
| die zone | — | 155° C. |

Amounts given in the examples below are in parts by weight, unless otherwise specified.

EXAMPLE 1

This example demonstrates the difference between polyvinyl chloride and chlorinated polyvinyl chloride in making low density foam. Sample A below, containing polyvinyl chloride, did not foam whereas sample B, containing chlorinated polyvinyl chloride, produced a good foam product wherein cell size was on the order of 200 to 300 microns, as measured with the aid of photomicrographs. Sample C was prepared with a lower molecular weight chlorinated polyvinyl chloride in absence of azodicarbonamide nucleating agent and had a preponderance of cells in the size range exceeding 1000 microns. The polyvinyl chloride used to prepare chlorinated polyvinyl chloride had inherent viscosity of 1.0 for Sample B and 0.75 for Sample C. Although there are slight variations in the formulation of sample C as compared to sample B, these variations are considered to be negligible in their effect on the cell size. The formulations given in Table I, below, were soaked in trichlorofluoromethane, and then foamed in the manner described above. The stabilizer in Table I was dibutyl tin dithioglycolate and the azo activator was a proprietary tin compound.

TABLE I

| Ingredients | Sample A | Sample B | Sample C |
|---|---|---|---|
| Polyvinyl chloride | 100 | — | — |
| Chlorinated Polyvinyl Chloride (67% Cl) | — | 100 | 100 |
| Butyl Tin Stabilizer | 1.5 | 3 | 3 |
| Azo Activator | 0.5 | 0.5 | — |
| Styrene/Acrylonitrile Copolymer (25% AN) | 10 | 10 | 10 |
| Chlorinated Polyethylene (35% Cl) | 3 | 3 | 3 |
| Calcium Stearate | 0.8 | 0.8 | 0.8 |
| Ethylene Bis-Stearamide | 0.8 | 0.8 | 0.8 |
| Ester Wax | 0.8 | 0.8 | 0.8 |
| Azodicarbonamide | 0.5 | 0.5 | — |
| Magnesium Hydroxide | 0.25 | 0.25 | — |
| Titanium Dioxide | 0.8 | 0.8 | — |

EXAMPLE 2

Samples of chlorinated polyvinyl chloride resin were prepared, together with other ingredients, and then were soaked in trichlorofluoromethane, melted and then foamed in the manner already described. The citric acid-bicarbonate system was tested herein with and without azodicarbonamide and the results show that only azodicarbonamide, with or without citric acid-bicarbonate system, produces foam having average cell size of 500 microns or less. In Table II, below, the stabilizer was dibutyl tin dithioglycolate; DSP represents disodium phosphate stabilizer for the resin; lubricants were calcium stearate, ethylene bis-stearamide and ester wax, each used in one-third proportion; the SAN copolymer "A" had dilute solution viscosity of 3.5 whereas copolymer "B" had DSV of 1.4. Sample C of SAN copolymer was obtained from Dow Chemical and its DSV is not known. The results are given in Table II, below:

TABLE II

| Ingredients | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Chlorinated PVC (67% Cl) | 100 | 100 | 100 | 100 | 100 | 100 | 100 | 100 | 100 | 100 | 100 | 100 | 100 | 100 | 100 |
| Butyl Tin Stabilizer | 3 | 3 | 3 | 3 | 3 | 3 | 3 | 3 | 3 | 3 | 3 | 3 | 3 | 3 | 3 |
| A-Styrene/Acrylonitrile Copolymer (25% AN) | 10 | 10 | 10 | 10 | 10 | 10 | 10 | 10 | 10 | 10 | 10 | — | — | 5 | 2.5 |
| B-Styrene/Acrylonitrile Copolymer (25% AN) | — | — | — | — | — | — | — | — | — | — | — | 10 | — | — | — |
| C-Styrene/Acrylonitrile Copolymer (25% AN) | — | — | — | — | — | — | — | — | — | — | — | — | 10 | — | — |
| Chlorinated Polyethylene (35% Cl) | 3 | 3 | 3 | 3 | 3 | 3 | 3 | 3 | 3 | 3 | 3 | 3 | 3 | 3 | 3 |
| DSP | — | — | — | — | — | — | — | — | 1 | — | — | — | — | — | — |
| Titanium Dioxide | — | — | — | — | — | — | — | — | — | 1 | — | — | — | — | — |
| Calcium Carbonate | — | — | — | — | — | — | — | — | — | — | 1 | — | — | — | — |
| Lubricants | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 |
| Azodicarbonamide | — | — | — | .2 | .2 | .2 | .2 | .5 | .5 | .5 | .5 | .5 | .5 | .5 | .5 |
| Citric Acid | .05 | .15 | .5 | — | .05 | .15 | .5 | — | — | — | — | — | — | — | — |
| Sodium bicarbonate | .05 | .15 | .5 | — | .05 | .15 | .5 | — | — | — | — | — | — | — | — |
| Cell Size (microns) Average | 950 | 925 | 600 | 325 | 350 | 275 | 375 | 250 | 200 | 200 | 225 | 175 | 175 | 200 | 200 |

EXAMPLE 3

Additional samples were prepared and foamed, as described, to test p-toluene sulfonyl semicarbazide (TSS), p,p'-oxybis (benzene sulfonyl hydrazide) (BSH), as well as citric acid and sodium bicarbonate, as nucleating agents alone and combined with each other. The primary blowing agent was trichlorofluoromethene and the stabilizer was dibutyl tin dithioglycolate. Results are given in Table III, below, where it is shown that azodicarbonamide is necessary as a nucleating agent to insure the small cell size. The other nucleating agents tested here fall short in their ability to achieve small cell size. The amounts given are in parts by weight.

TABLE III

| Ingredients | Samples | | | | | | | | |
|---|---|---|---|---|---|---|---|---|---|
| | 1 | 2 | 3 | 4 | 5 | 6 | 7 | 8 | 9 |
| CPVC Resin, 67% Cl | 100 | 100 | 100 | 100 | 100 | 100 | 100 | 100 | 100 |
| Butyl Tin Stabilizer | 3 | 3 | 3 | 3 | 3 | 3 | 3 | 3 | 3 |
| Styrene Acrylonitrile Copolymer (25% AN) | 10 | 10 | 10 | 10 | 10 | 10 | 10 | 10 | 10 |
| Calcium Stearate Lubricant | 0.8 | 0.8 | 0.8 | 0.8 | 0.8 | 0.8 | 0.8 | 0.8 | 0.8 |
| Ethylene Bis-Stearamide | 0.8 | 0.8 | 0.8 | 0.8 | 0.8 | 0.8 | 0.8 | 0.8 | 0.8 |
| Ester Wax | 0.8 | 0.8 | 0.8 | 0.8 | 0.8 | 0.8 | 0.8 | 0.8 | 0.8 |
| Calcium Carbonate (0.7 mu) | 1 | — | 1 | 1 | 1 | 1 | 1 | 1 | 1 |
| Calcium Carbonate (0.07 mu) | — | 1 | — | — | — | — | — | — | — |
| Azodicarbonamide | 0.5 | 0.5 | — | — | 0.25 | 1 | — | — | — |
| TSS | — | — | 0.5 | — | — | — | — | — | — |
| BSH | — | — | — | — | 0.5 | — | — | — | — |
| Sodium Bicarbonate | — | — | — | — | — | — | 0.5 | — | 0.25 |
| Citric Acid | — | — | — | — | — | — | — | 0.5 | 0.25 |
| Cell Size (Microns) | 250 | 175 | 450 | 775 | 200 | 200 | 500 | 950 | 975 |

We claim:

1. A foam product comprising expanded chlorinated polyvinyl chloride resin having a minimum chlorine content of at least 60% by weight composed of numerous cells throughout containing 5 to 50 parts by weight of a chlorofluoroalkane of 1 to 2 carbon atoms and retained nitrogen that is a decomposition product of 0.01 to 2 parts by weight of azodicarbonamide, all amounts are based on 100 parts by weight of the resin, the azodicarbonamide forms cell nuclei containing nitrogen as a decomposition product thereof which cell nuclei form expanded cells when the chlorofluoroalkane is introduced and expanded, the foam has a density of less than 20 lbs/ft$^3$, at least 60% of the cells in the foam are closed cells, and the cells are smaller than 500 microns, said product being devoid of a substantial amount of an inorganic powdery substance and a substantial amount of a solvent for the resin.

2. Product of claim 1 having density of about 1 to 5 lbs/ft$^3$, thermal conductivity at room temperature of less than 0.20 Btu/(hr) (ft$^2$) (°F./in), at least 85% of the cells being closed cells, the resin having a glass transition temperature of at least 105° C. and a chlorine content of at least 64%, and amount of the chlorofluoroalkane is 10 to 40 parts.

3. Product of claim 2 wherein preponderance of the cells are 200 microns or smaller in size and amount of azodicarbonamide is 0.1 to 1 parts.

4. Product of claim 3 wherein the resin has chlorine content of about 64% to 73%, the product has a density of about 1 to 5 lbs/ft$^3$ and also includes an effective amount of a lubricant, a processing aid, and a stabilizer.

5. Composition of matter that can be foamed to form an expanded product having density of less than 20 lbs/ft$^3$ and cell size less than 500 microns comprising a mixture of chlorinated polyvinyl chloride resin having a minimum chlorine content of at least 60% by weight, 5 to 50 parts by weight of the resin of a primary blowing agent selected from chlorofluoroalkane of 1 to 2 carbon atoms, and 0.1 to 2 parts by weight of the resin of azodicarbonamide nucleating agent, all based on 100 parts by weight of the resin.

6. Composition of claim 5 wherein said resin contains at least 64% chlorine, amount of the primary blowing agent is 10 to 40 parts and amount of azodicarbonamide is 0.1 to 1%.

7. Composition of matter of claim 5 that is adapted to be foamed to form an expanded product having density of 1 to 5 lbs/ft$^3$ that includes an effective amount of a stabilizer, an effective amount of a processing aid, and an effective amount of a lubricant.

8. Composition of claim 7 wherein amount of the stabilizer is 0.5 to 5 parts by weight, amount of the processing aid is 1 to 30 parts by weight, and amount of the lubricant is 1 to 5 parts by weight, based on 100 parts by weight of the resin.

9. Composition of claim 8 wherein the resin has a glass transition temperature of at least about 105° C. and chlorine content of about 64 to 73%.

10. Composition of claim 9 wherein the resin and azodicarbonamide are in powder form and the primary blowing agent is trichlorofluoromethane in liquid form under pressure.

* * * * *